US007447491B2

(12) United States Patent
Khoini-Poorfard (10) Patent No.: US 7,447,491 B2
(45) Date of Patent: Nov. 4, 2008

(54) MULTI-TUNER INTEGRATED CIRCUIT ARCHITECTURE UTILIZING FREQUENCY ISOLATED LOCAL OSCILLATORS AND ASSOCIATED METHOD

(75) Inventor: Ramin Khoini-Poorfard, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 709 days.

(21) Appl. No.: 10/456,215

(22) Filed: Jun. 6, 2003

(65) Prior Publication Data

US 2004/0248532 A1    Dec. 9, 2004

(51) Int. Cl.
*H04B 1/10* (2006.01)
(52) U.S. Cl. ............... 455/258; 455/209; 455/553.1
(58) Field of Classification Search ........... 455/3.01, 455/3.02, 76, 313, 150.1, 180.3, 255, 258, 455/209, 196.1, 197.3, 553.1
See application file for complete search history.

(56) References Cited

U.S. PATENT DOCUMENTS

| | | | | |
|---|---|---|---|---|
| 4,580,289 | A * | 4/1986 | Enderby ............... | 455/314 |
| 5,187,589 | A * | 2/1993 | Kono et al. ............ | 386/83 |
| 5,982,823 | A | 11/1999 | Jacklin ............... | 375/344 |
| 6,031,878 | A | 2/2000 | Tomasz et al. ........ | 375/316 |
| 6,073,000 | A * | 6/2000 | Shinohara ............ | 455/314 |
| 6,118,498 | A * | 9/2000 | Reitmeier ............ | 455/182.5 |
| 6,134,429 | A | 10/2000 | Feyfant et al. ........ | 455/324 |
| 6,148,184 | A | 11/2000 | Manku et al. ........ | 455/110 |
| 6,151,488 | A * | 11/2000 | Brekelmans .......... | 455/335 |
| 6,239,844 | B1 * | 5/2001 | Raiyat ............... | 348/468 |
| 6,356,736 | B2 | 3/2002 | Tomasz et al. ........ | 455/3.02 |
| 6,377,315 | B1 | 4/2002 | Carr et al. ............ | 348/726 |
| 6,512,472 | B1 | 1/2003 | Smith et al. .......... | 341/155 |
| 6,782,249 | B1 * | 8/2004 | Feldman .............. | 455/76 |
| 6,888,580 | B2 * | 5/2005 | Dujmenovic .......... | 348/731 |
| 7,002,639 | B2 * | 2/2006 | Kawai ................. | 455/209 |
| 2001/0002224 | A1 * | 5/2001 | Sasaki et al. .......... | 386/109 |
| 2003/0068997 | A1 * | 4/2003 | Peusens et al. ........ | 455/313 |
| 2004/0102154 | A1 * | 5/2004 | Klauss et al. ......... | 455/3.01 |
| 2004/0205827 | A1 * | 10/2004 | Krone ................ | 455/258 |

OTHER PUBLICATIONS

Brett, et al., "A Direct-Conversion L-Band Tuner for Digital DBS," ISSCC 98/Session 8/Wireless Receivers/Paper FA 8.3, IEEE International Solid-State Circuits Conference (1998).

(Continued)

*Primary Examiner*—Edward Urban
*Assistant Examiner*—Adeel Haroon
(74) *Attorney, Agent, or Firm*—O'Keefe, Egan, Peterman & Enders, LLP (57) ABSTRACT

Integrated multiple tuner architectures and associated methods are disclosed that utilize frequency isolated local oscillators (LO). These architectures utilize dividers and multipliers within the signal paths for the local oscillator mixing signals to reduce interference among the multiple local oscillators operating on a single integrated circuit. A multiple tuner direct-down-conversion (DDC) receiver and a multiple tuner intermediate frequency (IF) receiver are provided as example embodiments. And an example integrated multi-tuner satellite receiver is also described.

26 Claims, 5 Drawing Sheets

OTHER PUBLICATIONS

Jayaraman, et al., "*A Fully Integrated Broadband Direct-Conversion Receiver for DBS Applications,*" ISSCC 2000/Session 8/Wireless RX/TX/Paper TA 8.2, IEEE International Solid-State Circuits Conference (2000).

Conexant Data Sheet No. 100584A, "*CX24108 Digital Satellite Tuner,*" Nov. 2000.

Vaucher, et al., "*A Wide-Band Tuning System for Fully Integrated Satellite Receivers,*" IEEE Journal of Solid-State Circuits, vol. 33, No. 7, Jul. 1998.

* cited by examiner

MULTI-TUNER INTEGRATED CIRCUIT ARCHITECTURE UTILIZING FREQUENCY ISOLATED LOCAL OSCILLATORS AND ASSOCIATED METHOD

TECHNICAL FIELD OF THE INVENTION

This invention relates to receiver architectures for high frequency transmissions and more particularly to set-top box receiver architectures for satellite television communications.

BACKGROUND

Conventional home satellite television systems utilize a fixed dish antenna to receive satellite communications. After receiving the satellite signal, the dish antenna circuitry sends a satellite spectrum signal to a satellite receiver or set-top box that is often located near a television through which the viewer desires to watch the satellite programming. This satellite receiver uses receive path circuitry to tune the program channel that was selected by the user. Throughout the world, the satellite channel spectrum sent to the set-top box is often structured to include 32 transponder channels between 950 MHz and 2150 MHz with each transponder channel carrying a number of different program channels. Each transponder will typically transmit multiple program channels that are time-multiplexed on one carrier signal. Alternatively, the multiple program channels may be frequency multiplexed within the output of each transponder. The total number of received program channels considering all the transponders together is typically well over 300 program channels.

In general, the most ideal receiver architecture for an integrated circuit from a bill-of-material point of view is usually a direct down conversion (DDC) architecture. However, in practice, there are several issues that often prohibit the practical design of integrated circuit implementations that use DDC architectures. These issues typically include noise from the DC offset voltage and 1/f noise from baseband circuitry located on the integrated circuit. In mobile applications, such as with cellular phones, the DC offset voltage is a time varying entity which makes its cancellation a very difficult task. In other applications where mobility is not a concern, such as with satellite receivers, the DC offset voltage can be stored and cancelled, such as through the use of external storage capacitors. However, 1/f noise is still an issue and often degrades CMOS satellite tuners that use a DDC architecture.

An additional problem with DDC architectures that often arises is an interference problem that occurs due to the proximity of the center frequency for a selected channel with the frequency of the DDC mixing signal. To solve this interference problem, some systems have implemented receivers where the DDC mixing frequency is double (or half) of what the required frequency is, and at the mixer input, a divider (or doubler) translates the DDC mixing signal into the wanted frequency. Furthermore, where two tuners are desired on the same integrated circuit, two DDC receivers, as well as two low-IF receivers, will have a tendency to interfere with each other, and their VCOs also have a tendency to inter-lock into one another, particularly where the selected transponder channels for each tuner are close together.

SUMMARY OF THE INVENTION

The present invention is integrated multiple tuner architectures that utilize frequency isolated local oscillators (LO) and associated methods. These architectures utilize dividers and multipliers within the signal paths for the local oscillator mixing signals to reduce interference among the multiple local oscillators operating on a single integrated circuit. A multiple tuner direct-down-conversion (DDC) receiver and a multiple tuner intermediate frequency (IF) receiver are provided as example embodiments that utilize the present invention. And an example integrated multi-tuner satellite receiver is also described.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an integrated multi-tuner receiver architecture and associated method. The disclosed architecture utilizes dividers and multipliers in the signal paths for the local oscillator (LO) mixing signals so that interference among multiple LOs operating on the same integrated circuit is reduced. With this architecture, therefore, multiple direct-down-conversion (DDC) or intermediate frequency (IF) receive paths can be integrated on a single integrated circuit without suffering from interference problems that would plague conventional architectures if multiple conventional tuners were placed on the same integrated circuit.

Figure 4:
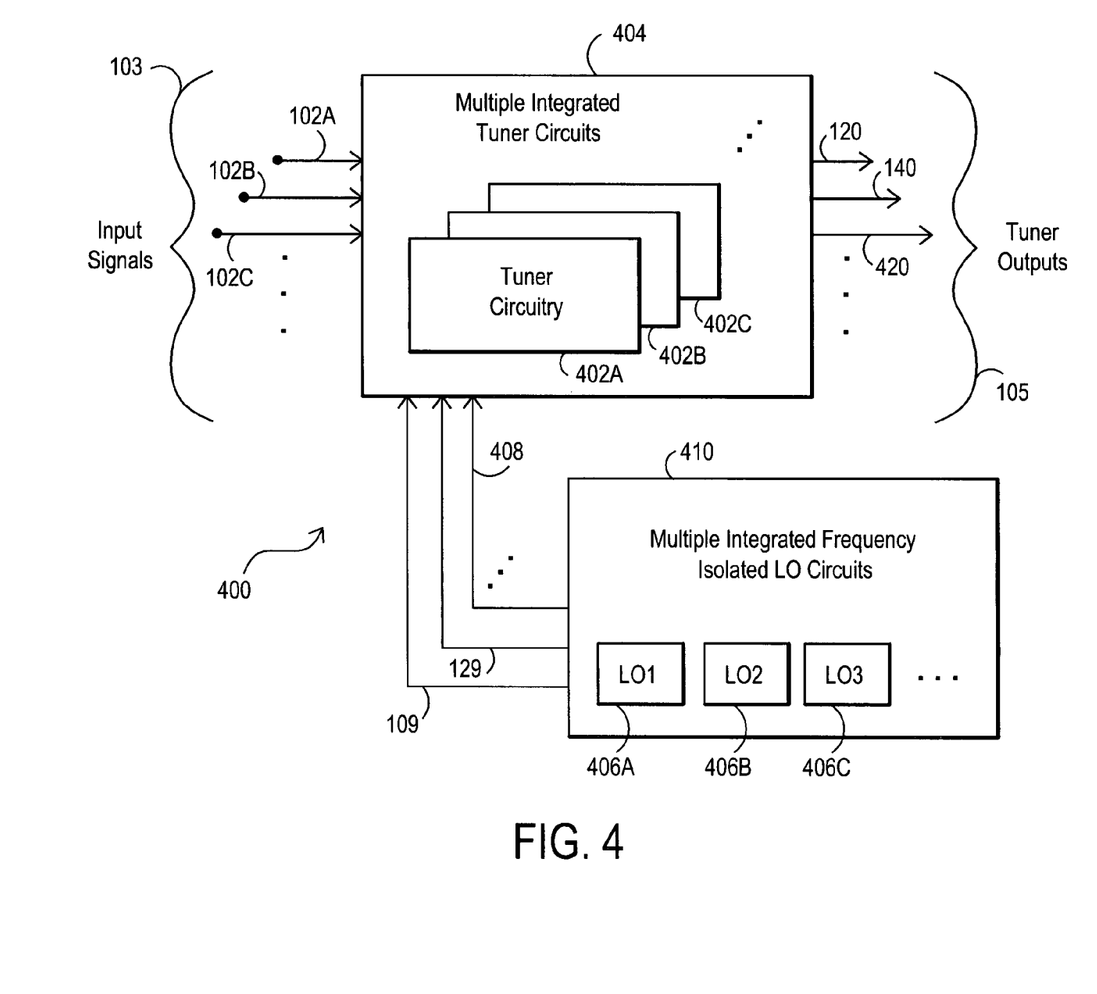
FIG. 4 is a block diagram for a more general embodiment according to the present invention in which multiple frequency isolated local oscillator circuits are utilized with multiple tuner circuits.
Figure 5:
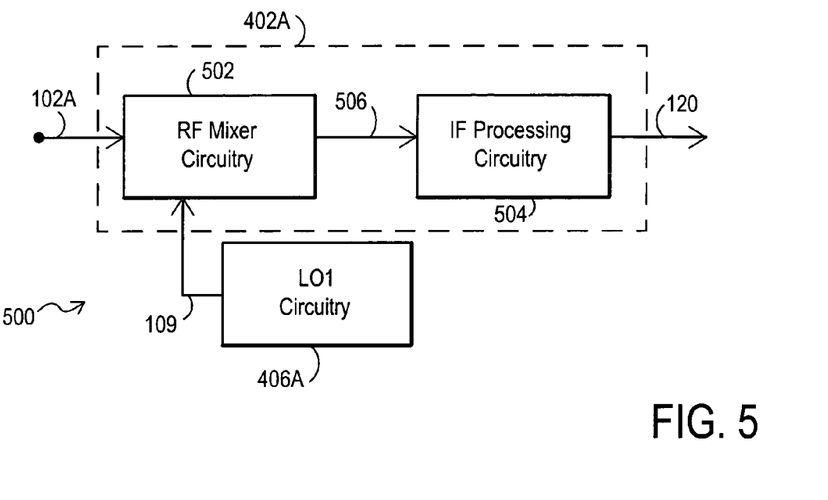
FIG. 5 provides an example embodiment that utilizes intermediate frequency (IF) tuner circuitry for the multiple tuner circuits.
Figure 6:
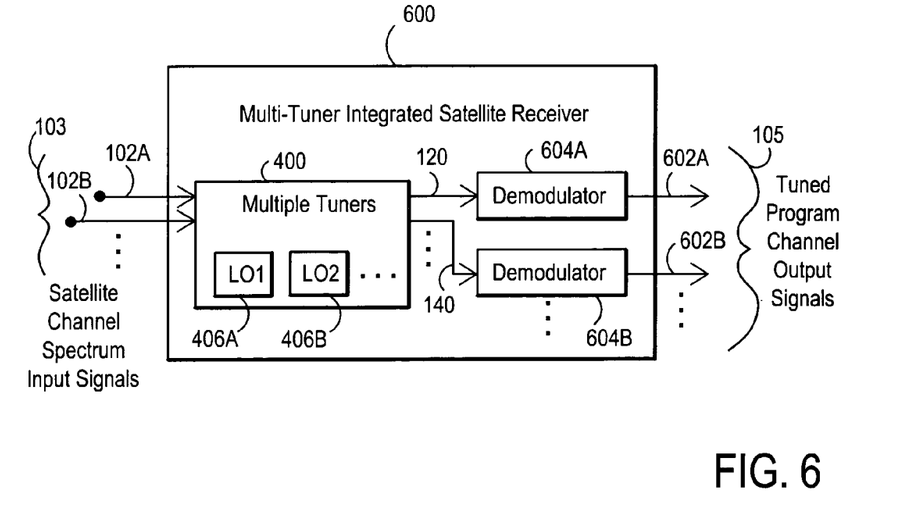
FIG. 6 is a block diagram for a multi-tuner integrated satellite receiver that utilizes a multiple tuner architecture which includes frequency isolated local oscillators according to the present invention.

Initially, with respect to FIGS. 1A-C, 2 and 3, a multi-tuner DDC solution is discussed. FIG. 4 provides a more general block diagram for a integrated multi-tuner receiver. FIG. 5 provides an example block diagram for IF receive path circuitry. And FIG. 6 provides an example implementation of the present invention within a multi-tuner integrated satellite receiver.

Figure 1A:
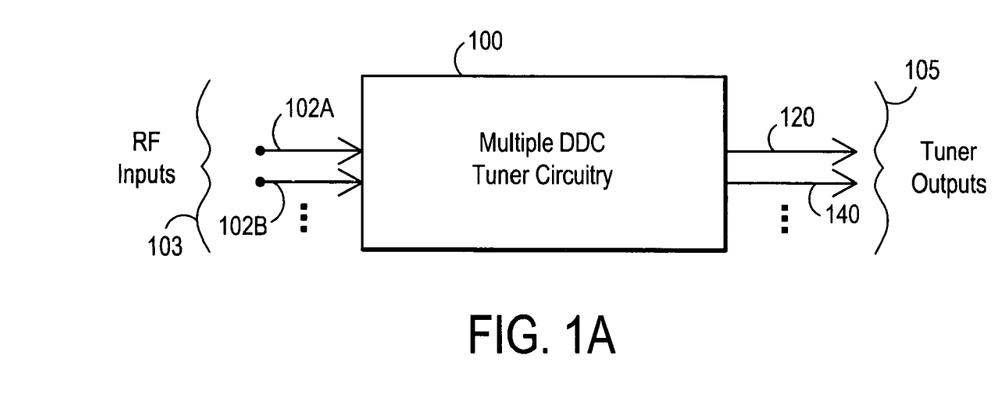
FIG. 1A is a block diagram for a multiple direct down conversion (DDC) tuner.

FIG. 1A is a block diagram for a multiple direct down conversion (DDC) tuner 100. The multiple DDC tuner circuitry 100 receives one or more channel spectrum signals 103, such as radio frequency (RF) channel spectrum input signals 102A, 102B, . . . , and provides as outputs two or more receiver output signals 120, 140 . . . at baseband. These tuner outputs 105 can then be further processed or utilized by other circuitry.

Figure 1B:
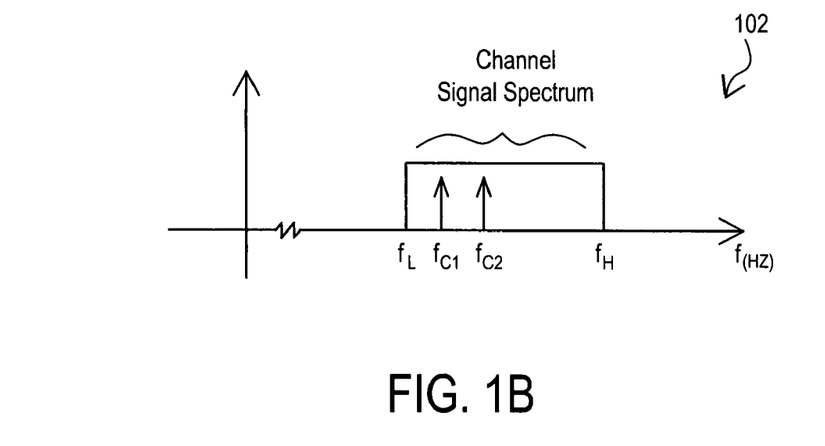
FIG. 1B is a diagram for an input channel signal spectrum.
Figure 1C:
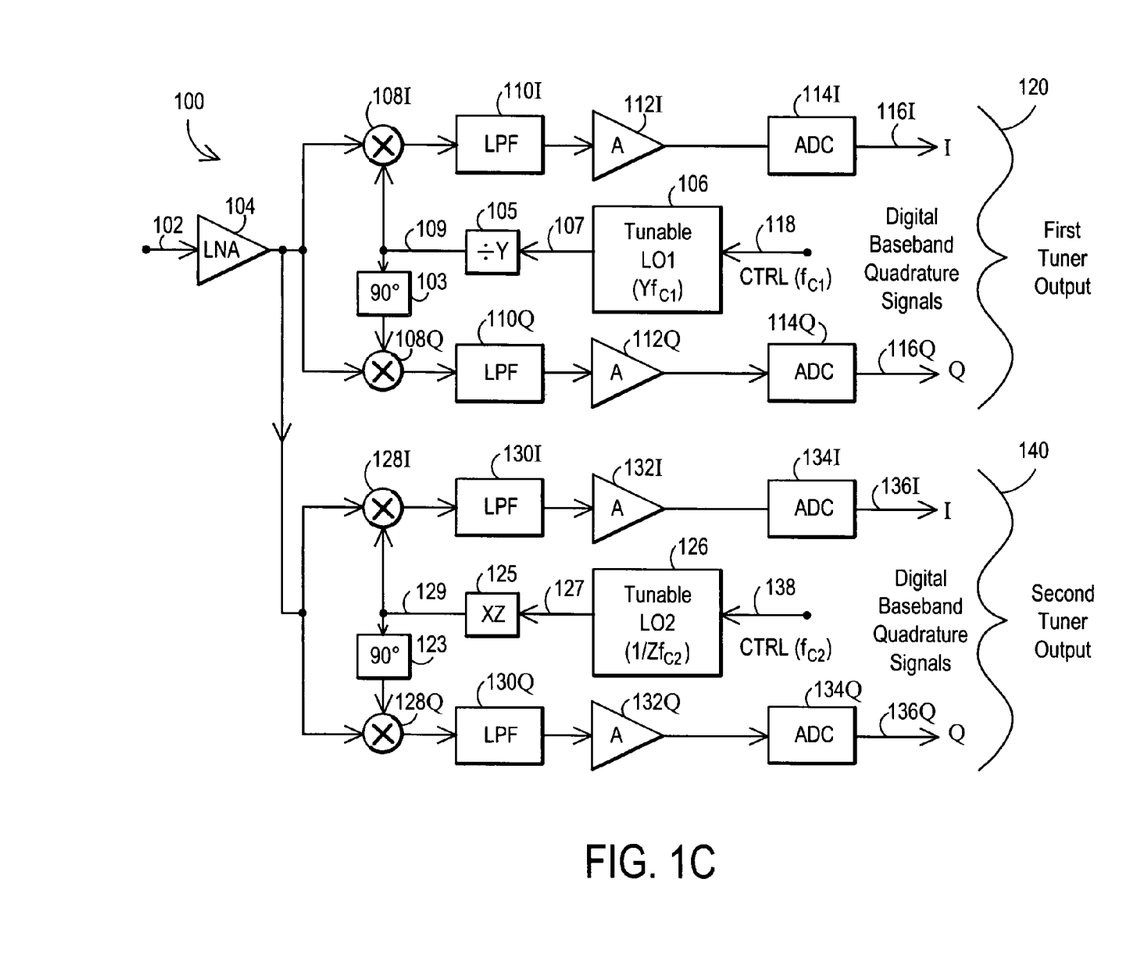
FIG. 1C is a more detailed block diagram for a multiple DDC tuner that includes two receive paths and provides two tuner outputs.

FIG. 1B is a signal spectrum diagram for an example RF input signal 102. This RF input signal includes a plurality of channels with its channel signal spectrum between a low frequency boundary ($f_L$) and a high frequency boundary ($f_H$). Two example channels that will be used for the example embodiment discussed below with respect to FIG. 1C are a channel centered on a first channel center frequency ($f_{C1}$) and a channel centered on a second channel center frequency ($f_{C2}$). It is noted, as discussed below, that for direct down conversion these two channels are mixed directly down to DC with a first mixing signal at the first channel center frequency ($f_{C1}$) and a second mixing signal at the second channel center frequency ($f_{C2}$). With respect to the satellite receiver embodiment discussed with respect to FIG. 3 below, a satellite spectrum signal received by a set-top box may be structured, as indicated above, to include 32 transponder channels between 950 MHz and 2150 MHz with each transponder channel carrying a number of different program channels. The total number of received program channels considering all the transponders together is typically well over 300 program channels. The frequency separated LO circuits of the present invention are particularly advantageous where the channels with the channel signal spectrum are relatively closely spaced such that two LOs attempting to tune two adjacent channels would likely interfere with each other if those two LOs were integrated on the same integrated circuit. This interference problem is reduced and/or avoided through the use of the frequency separated LO circuits of the present invention.

FIG. 1C is a more detailed block diagram for a multiple DDC tuner 100 that includes two receive paths and provides a first tuner output 120 and a second tuner output 140. In the embodiment depicted, a single RF input signal 102 is received and processed by low noise amplifier (LNA) 104. The output of the LNA 104 is then provided to both receiver paths. It is noted that multiple RF input signals could be received and multiple LNAs could be utilized to process these different RF input signals, if desired.

Looking at the first receive path, the signal spectrum from LNA 104 is sent to real path mixer 108I and imaginary path mixer 108Q. These mixers 108I/108Q also receive mixing signal inputs derived from a signal generated by a first tunable local oscillator (LO1) 106. In particular, LO1 106 receives a control signal (CTRL($f_{C1}$)) 118 that identifies the first center frequency ($f_{C1}$) to which the first receive path is to tune. The LO1 106 is configured to generate an output oscillation signal 107 that is a factor "Y" times the first center frequency ($f_{C1}$). This output oscillation signal ($Yf_{C1}$) 107 is then passed through divider (÷Y) 105 to divide the output oscillation signal ($Yf_{C1}$) 107 by Y. The resulting mixing signal 109 is at the desired center frequency for the first channel and is provided to real path mixer 108I and to imaginary path mixer 108Q through 90 degree phase shift block 103. The outputs of the mixers 108I and 108Q represent a real and imaginary path signals directly converted to DC. From this point, the quadrature signals can be passed through low pass filters (LPFs) 110I and 110Q, amplifiers (A) 112I and 112Q, and analog-to-digital converters (ADCs) 114I and 114Q, respectively. And the output of the first receive path is baseband I and Q quadrature signals 116I and 116Q. This first tuner output 120 can then be used by a baseband processor or other circuitry.

The second receive path is similar to the first receive path but uses a different local oscillator output signal. As with the first receive path, the signal spectrum from LNA 104 is sent to real path mixer 128I and imaginary path mixer 128Q. These mixers 128I/128Q receive mixing signal inputs derived from a signal generated by a second tunable local oscillator (LO2) 126. In particular, LO2 126 receives a second control signal (CTRL($f_{C2}$)) 138 that identifies the second center frequency ($f_{C2}$) to which the second receive path is to tune. To reduce interference with LO1 106, LO2 126 is configured to generate a second oscillation signal 127 that is relatively far from the first oscillation signal 107 generated by LO1 106. In particular, the LO2 126 is configured to generate an output oscillation signal 127 that is at the second center frequency ($f_{C2}$) divided by the factor "Z." This output oscillation signal ($f_{C2}$/Z) 127 is then passed through multiplier 125 to multiply the output oscillation signal ($f_{C2}$/Z) 127 by Z. The resulting mixing signal 129 is at the desired center frequency for the second channel and is provided to real path mixer 128I and to imaginary path mixer 128Q through 90 degree phase shift block 123. The outputs of the mixers 128I and 128Q represent real and imaginary path signals directly converted to DC. From this point, the quadrature signals can be passed through low pass filters (LPFs) 130I and 130Q, amplifiers (A) 132I and 132Q, and analog-to-digital converters (ADCs) 134I and 134Q, respectively. And the output of the first receive path is baseband I and Q quadrature signals 136I and 136Q. This second tuner output 140 can then be used by a baseband processor or other circuitry.

It is noted that the example embodiment of FIG. 1C could be expanded to include more receive paths, as desired. And each receive path could have a separate LO and a separate associated divider or multiplier. As such, each LO would provide an output oscillation signal that is N times or 1/N times the desired channel center frequency. And this output oscillation signal would be divided by N or multiplied by N, respectively, to obtain the desired mixing signal for the mixers in order to mix the desired channel to DC. It is further noted that with respect to the embodiment of FIG. 1C, the factors Y and Z could be the same, and these factors could be, for example, 2 or 4. With Y=Z=2, the output oscillation signal 107 from LO1 106 would be $2f_{C1}$, and the output oscillation signal 127 from LO2 126 would be $f_{C2}/2$. In addition, as indicated above, the multipliers and dividers used with the LO circuitry for each receive path can be selected such that interference among the different LOs is reduced or minimized for the particular application in which the multiple DDC receiver architecture of the present invention is being utilized. It is further noted that any combination of multipliers and dividers could be used for the LOs. In other words, with the example of FIG. 1C, the two oscillation signals 107 and 127 generated by LOs 106 and 126, respectively, could be $Yf_{C1}$ and $Zf_{C2}$, could be $Yf_{C1}$ and $f_{C2}/Z$ (the example shown), could be $f_{C1}/Y$ and $Zf_{C1}$, or could be $f_{C1}/Y$ and $f_{C1}/Z$. Looking to the example embodiment of FIG. 1C, it is further noted that for closely spaced channels, the frequencies at nodes 109 and 129 could be near each other. However, interference caused by these nodes can be handled more easily than interference that is more directly coupled to the LO circuitry itself. Thus, by separating the oscillation frequencies at which the LOs are operating, the present invention advantageously reduces and/or avoids interference problems.

Figure 2:
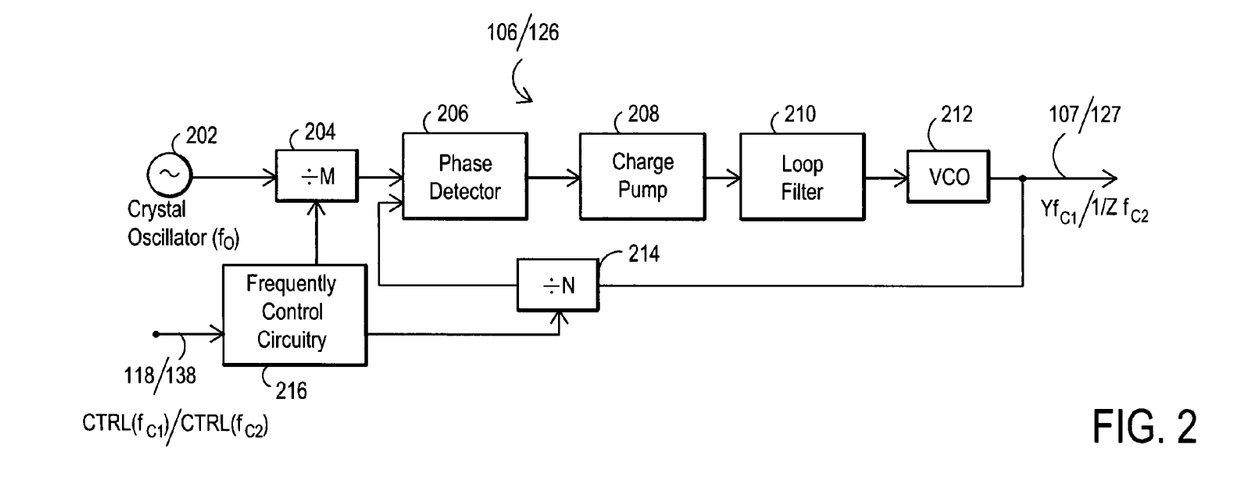
FIG. 2 is a block diagram for tunable local oscillator (LO) circuitry.

FIG. 2 is a block diagram for tunable local oscillator (LO) circuitry that could be utilized for LO1 106 and LO2 126 in the example of FIG. 1C. The embodiment depicted utilizes phase-lock-loop (PLL) circuitry, including a voltage controlled oscillator (VCO), to provide a tunable output signal. In particular, a phase detector 206 receives an input from divide-by-M (÷M) divider 204, which represents a divided version of a reference frequency ($f_0$) from crystal oscillator 202, and an input from divide-by-N (÷N) divider 214, which represents a divided version of the output frequency. The output of the phase detector 206 is sent to a charge pump 208 and to a loop filter 210, the output of which in turn controls a voltage controlled oscillator (VCO) 212. The VCO 212 can be, for example, and LC tank based VCO that provides a variable output frequency which is dependent upon one or more voltage input signals. The settings for the two dividers 204 and 214 are controlled by frequency control circuitry 216 depending upon the control signals it receives. In particular, for LO1 106 in the embodiment of FIG. 1C, the frequency control circuitry 216 would receive control signal (CTRL($f_{C1}$)) 118 indicating the center frequency for the first channel to be tuned, and the output of the LO circuitry would be the oscillation signal 107 at Y times the first channel center frequency ($f_{C1}$). For LO2 126 in the embodiment of FIG. 1C, the frequency control circuitry 216 would receive control signal (CTRL($f_{C2}$)) 138 indicating the center frequency for the second channel to be tuned, and the output of the LO circuitry would be the oscillation signal 127 at the second channel center frequency ($f_{C2}$) divided by Z.

Figure 3:
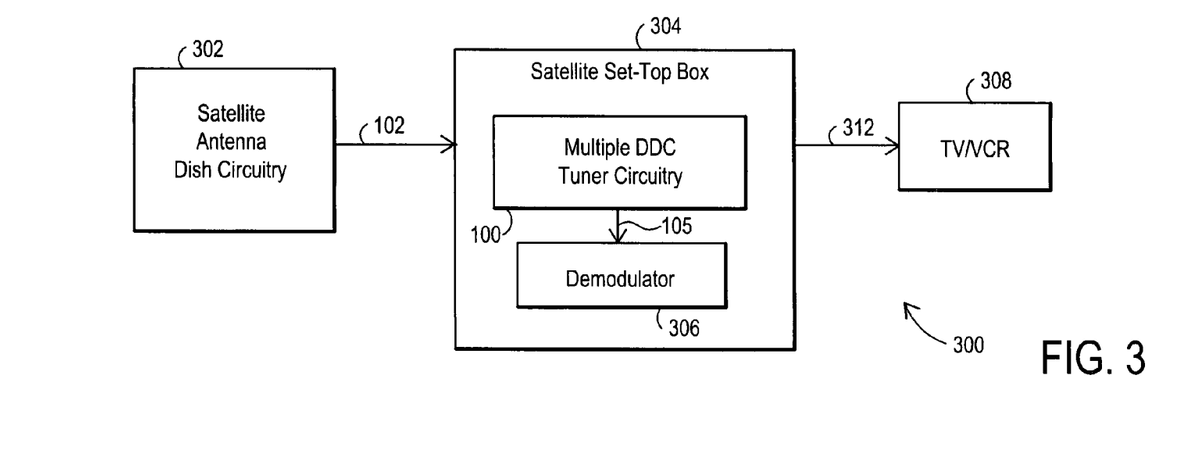
FIG. 3 is a block diagram for a satellite set-top box implementation that utilizes the multiple DDC tuner architecture of the present invention.

FIG. 3 is a block diagram for a satellite set-top box implementation that utilizes the multiple DDC tuner architecture of the present invention. Satellite spectrum signals, for example, may include a plurality of transponder channels with each transponder channel in turn include a plurality of modulated program channels. In the embodiment 300 of FIG. 3, satellite antenna dish circuitry 302 receives a satellite signal and outputs a RF transponder channel signal spectrum 102. The satellite set-top box 304 receives this transponder channel signal spectrum 102 and utilizes multiple DDC tuner circuitry 100 to provide a plurality of tuner outputs 105 representing one or more tuned transponder channels. The demodulator circuitry 306 processes these tuner outputs 105 to provide one or more tuned program channels. If desired, the demodulator circuitry 306 can be integrated with the multiple DDC tuner circuitry 100. These tuned program channels may then be utilized, for example, with a TV/VCR 308 through output signals 312 from satellite set-top box 304.

FIG. 4 is a block diagram for a more general embodiment 400 according to the present invention in which multiple frequency isolated LOs 410 are utilized with multiple integrated tuner circuits 404. In other words, the architecture of the present invention can be utilized to integrate multiple LOs on a single integrated circuit, and these multiple frequency isolated LO circuits can be used with respect to any desired receive path circuitry. As discussed above, the frequency isolated LO architecture of the present invention is particularly advantageous for integrated circuits that include multiple receive paths on a single integrated circuit. In the embodiment depicted in FIG. 4, multiple integrated frequency isolated LO circuits 410 includes LO1 circuitry 406A, LO2 circuitry 406B, LO3 circuitry 406C, and so on. As discussed above, these multiple LO circuits operate at isolated frequencies and use dividers/multipliers to provide a plurality of LO mixing signals 109, 129, 408, and so on, that are utilized by the multiple integrated tuner circuits 404, which includes tuner circuitry 402A, tuner circuitry 402B, tuner circuitry 402C, and so on. The multiple integrated tuner circuits 404 receive a plurality of input signals 103, such as signals 102A, 102B, 102C, and so on, from one or more sources, and provide a plurality of a tuner outputs 105, such as signals 120, 140, 420, and so on. It is noted that the integrated tuners 402A, 402B, 402C, . . . , can be implemented using any desired receive path architecture that utilizes mixing signals from local oscillators. Two possible architectures are direct-down-conversion (DDC) architectures, as discussed above with respect to FIGS. 1A-1C, 2 and 3, and intermediate-frequency (IF) architectures, including low-IF and/or near-direct-down-conversion architectures, as discussed with respect to FIG. 5 below.

FIG. 5 provides an example embodiment 500 that utilizes an IF architecture for tuner circuitry 402A. In this embodiment, an RF input signal 102A is received by RF mixer circuitry 502. RF mixer circuitry 502 utilizes LO mixing signal 109 from the LO1 circuitry 406A to provide one or more output signals 506. The IF processing circuitry 504 processes the IF signals 506 and provides a tuned output signal 120 at baseband. The RF mixing circuitry 502 and the IF processing circuitry 504 can be implemented using a variety of architectures, and the output signals 506 may be, for example, a single signal at the IF frequency or complex I and Q signals at the IF frequency. The IF processing circuitry 504, for example, can include an analog IF mixer that utilizes an IF LO mixing signal or can include a digital IF mixer. According to the present invention, when the embodiment 500 is duplicated for a plurality of different tuner circuits 402A, 402B, 402C, . . . , the different LO circuits 406A, 406B, 406C, . . . , are designed such that their oscillation frequencies are isolated so as to reduce interference.

FIG. 6 is a block diagram for a multi-tuner integrated satellite receiver 600 that utilizes a multiple tuner architecture which includes frequency isolated local oscillators according to the present invention. The multi-tuner integrated satellite receiver 600 includes multiple tuners 400 which in turn includes multiple local oscillators (LO1, LO2, . . . ) 406A, 406B, . . . with oscillation frequencies that are isolated from each other. In operation, the multiple tuners 400 receive satellite channel spectrum input signals 103, such as channel signal spectrums 102A, 102B, . . . , from one or more satellite antennas, and the multiple tuners 400 provide a plurality of tuned output signals 120, 140, . . . that correlate to tuned satellite transponder channels. If desired, a plurality of demodulators 604A, 604B, . . . , may also be integrated on the same integrated circuit. These demodulators 604A, 604B, . . . receive the tuned output signals 120, 140, . . . and are configured to pull out program channel information from the tuned satellite transponder channels. The demodulators provide a plurality of tuned program channel output signals 105, such as output signals 602A, 602B, . . . , for use by other circuitry, as desired. It is noted that the multi-tuner integrated satellite receiver embodiment 600 depicted in FIG. 6 is merely one application for the integrated frequency isolated LO architecture of the present invention. And it is noted that an integrated satellite receiver could integrate the multiple tuners 400 and provide tuner output signals 120, 140, . . . to external circuits, such as separate demodulator circuitry, for further processing, as desired.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures for database processing. For example, equivalent elements may be substituted for those illustrated and described herein, and certain features of the invention may be utilized independently of the use of other features, all as would be apparent to one skilled in the art after having the benefit of this description of the invention.

What is claimed is:

1. A multiple tuner integrated circuit, comprising:
at least two tuners integrated on a single integrated circuit with each tuner configured to have a channel signal spectrum as an input, the two tuners comprising:
first receive path circuitry, comprising:
a first local oscillator (LO) having a first output oscillation signal at a first frequency, the first frequency representing a multiple or divisor of a frequency for a first mixing signal;
circuitry configured to process the first output oscillation signal and provide the first mixing signal;
mixer circuitry configured to mix an input channel signal spectrum with the first mixing signal; and
second receive path circuitry, comprising:
a second local oscillator (LO) having a second output oscillation signal at a second frequency, the second frequency representing a multiple or divisor of a frequency for a second mixing signal and the second frequency being selected as to reduce interference with the first frequency;
circuitry configured to process the second output oscillation signal and provide the second mixing signal; and
mixer circuitry configured to mix an input channel signal spectrum with the second mixing signal;
wherein the first LO has an output oscillation signal that is Y times the frequency for the first mixing signal and the second LO has an output oscillation signal that is the frequency for the second mixing signal divided by Z, such that the first mixing frequency is lower in frequency than the first output oscillation signal, and such that the second mixing frequency is higher in frequency than the second output oscillation signal.

2. The multiple tuner integrated circuit of claim 1, wherein the first receive path circuitry and the second receive path circuitry are configured to provide direct-down-conversion (DDC) to DC and wherein frequencies for the first and second mixing signals correlate to center frequencies for a first channel and a second channel.

3. The multiple tuner integrated circuit of claim 2, wherein the mixer circuitry within the first receive path circuitry and the mixer circuitry within the second receive path circuitry each comprises real and imaginary path mixers, the real and imaginary path mixers configured to output quadrature signals at DC.

4. The multiple tuner integrated circuit of claim 1, wherein Y and Z are the same number.

5. The multiple tuner integrated circuit of claim 4, wherein Y and Z are both 2 or 4.

6. The multiple tuner integrated circuit of claim 1, wherein the first LO and the second LO each comprises phase-locked-loop (PLL) circuitry having an output signal with a tunable frequency.

7. The multiple tuner integrated circuit of claim 6, wherein the PLL circuitry comprises LC-tank based voltage controlled oscillator (VCO) circuitry.

8. The multiple tuner integrated circuit of claim 1, wherein the mixer circuitry within the first receive path circuitry and the mixer circuitry within the second receive path circuitry are each configured to output a signal at an intermediate frequency and wherein frequencies for the first and second mixing signals correlate to center frequencies for signals needed to mix a first channel and a second channel to the intermediate frequency.

9. A satellite receiver having at least two tuner outputs, comprising:
an integrated circuit including at least two tuners integrated on a single integrated circuit with each tuner configured to have a satellite transponder channel signal spectrum as an input, the two tuners comprising:
first receive path circuitry, comprising:
a first local oscillator (LO) having a first output oscillation signal at a first frequency, the first frequency representing a multiple or divisor of a frequency for a first mixing signal;
circuitry configured to process the first output oscillation signal and provide the first mixing signal;
mixer circuitry configured to mix an input channel signal spectrum with the first mixing signal;
processing circuitry configured to process a signal from the mixer circuitry and to provide a first tuned digital transponder channel as an output; and
second receive path circuitry, comprising:
a second local oscillator (LO) having a second output oscillation signal at a second frequency, the second frequency representing a multiple or divisor of a frequency for a second mixing signal and the second frequency being selected as to reduce interference with the first frequency;
circuitry configured to process the second output oscillation signal and provide the second mixing signal;
mixer circuitry configured to mix an input channel signal spectrum with the second mixing signal; and
processing circuitry configured to process a signal from the mixer circuitry and to provide a second tuned digital transponder channel as an output;
wherein the first LO has an output oscillation signal that is Y times the frequency for the first mixing signal and the second LO has an output oscillation signal that is the frequency for the second mixing signal divided by Z, such that the first mixing frequency is lower in frequency than the first output oscillation signal, and such that the second mixing frequency is higher in frequency than the second output oscillation signal; and
demodulator circuitry configured to receive the first and second tuned digital transponder channels, the demodulator circuitry further configured to output one or more tuned program channels.

10. The satellite receiver of claim 9, wherein the first receive path circuitry and the second receive path circuitry are configured to provide direct-down-conversion (DDC) to DC and wherein frequencies for the first and second mixing signals correlate to center frequencies for a first channel and a second channel.

11. The satellite receiver of claim 10, wherein the mixer circuitry within the first receive path circuitry and the mixer circuitry within the second receive path circuitry each comprises real and imaginary path mixers, the real and imaginary path mixers configured to output quadrature signals at DC.

12. The satellite receiver of claim 9, wherein the mixer circuitry within the first receive path circuitry and the mixer circuitry within the second receive path circuitry are each configured to output a signal at an intermediate frequency and wherein frequencies for the first and second mixing signals correlate to center frequencies for signals needed to mix a first channel and a second channel to the intermediate frequency.

13. The satellite receiver of claim 9, wherein the demodulator circuitry is integrated on the same integrated circuit as the at least two tuners.

14. A method for tuning multiple channels on a single integrated circuit, comprising:

providing at least two tuners integrated on a single integrated circuit;

receiving a first channel signal spectrum as an input to first receive path circuitry for a first tuner;

generating a first output oscillation signal at a first frequency, the first frequency representing a multiple or divisor of a frequency for a first mixing signal;

processing the first output oscillation signal to provide the first mixing signal to mixer circuitry for a first tuner;

receiving a second channel signal spectrum as an input to second receive path circuitry for a second tuner;

generating a second output oscillation signal at a second frequency, the second frequency representing a multiple or divisor of a frequency for a second mixing signal and selecting the second frequency as to reduce interference with the first frequency;

configuring the first output oscillation signal to be Y times the frequency for the first mixing signal and configuring the second output oscillation signal to be frequency for the second mixing signal divided by Z, such that the first mixing frequency is lower in frequency than the first output oscillation signal, and such that the second mixing frequency is higher in frequency than the second output oscillation signal; and processing the second output oscillation signal to provide the second mixing signal to mixer circuitry for a second tuner.

15. The method of claim 14, further comprising configuring the first receive path circuitry and the second receive path circuitry to provide direct-down-conversion (DDC) to DC such that frequencies for the first and second mixing signals correlate to center frequencies for a first channel and a second channel.

16. The method of claim 14, further comprising configuring the mixer circuitry within the first receive path circuitry and the mixer circuitry within the second receive path circuitry to output a signal at an intermediate frequency such that frequencies for the first and second mixing signals correlate to center frequencies for signals needed to mix a first channel and a second channel to the intermediate frequency.

17. The method of claim 14, wherein Y and Z are the same number.

18. The method of claim 17, wherein Y and Z are both 2 or 4.

19. The method of claim 14, further comprising utilizing three or more tuners integrated on the single integrated circuit and configuring each additional tuner to receive a channel signal spectrum as an input to receive path circuitry, to generate an output oscillation signal at an additional frequency where the additional frequency represents a multiple or divisor of an additional frequency for an additional mixing signal, selecting the additional frequency as to reduce interference with other frequencies for the output oscillation signals, and processing the output oscillation signal to provide the additional mixing signal to mixer circuitry for the additional tuner.

20. The method of claim 14, further comprising utilizing a first local oscillator (LO) to generate the first output oscillation signal and utilizing a second local oscillator (LO) to generate the second output mixing signal, the first LO and the second LO each being configured to comprise phase-locked-loop (PLL) circuitry having an output signal with a tunable frequency.

21. The method of claim 14, wherein the first channel signal spectrum and the second channel signal spectrum are received through a common node.

22. An integrated circuit including multiple frequency isolated local oscillators, comprising:

a plurality of local oscillator circuits integrated on a single integrated circuit, each local oscillator circuit comprising:

a local oscillator (LO) having an output oscillation signal at an oscillation frequency, the oscillation frequency representing a multiple or divisor of a frequency for a desired mixing signal and the oscillation frequency being selected as to reduce interference with other oscillation frequencies; and circuitry configured to process the output oscillation signal and provide the desired mixing signal;

wherein the plurality of local oscillator circuits comprise at least a first LO and a second LO; and wherein the first LO has a first output oscillation signal that is Y times a frequency for a first mixing signal and the second LO has a second output oscillation signal that is a frequency for a second mixing signal divided by Z, such that the first mixing frequency is lower in frequency than the first output oscillation signal, and such that the second mixing frequency is higher in frequency than the second output oscillation signal.

23. The integrated circuit of claim 22, wherein Y and Z are the same number.

24. The integrated circuit of claim 23, wherein Y and Z are both 2 or 4.

25. The integrated circuit of claim 22, wherein each LO circuit comprises phase-locked-loop (PLL) circuitry having an output signal with a tunable frequency.

26. The integrated circuit of claim 25, wherein the PLL circuitry comprises LC-tank based voltage controlled oscillator (VCO) circuitry.

\* \* \* \* \*